(12) United States Patent
Wang et al.

(10) Patent No.: US 7,140,360 B2
(45) Date of Patent: Nov. 28, 2006

(54) SYSTEM FOR CONTROLLING EXHAUST EMISSIONS PRODUCED BY AN INTERNAL COMBUSTION ENGINE

(75) Inventors: Yue Yun Wang, Columbus, IN (US); Jian Wen Li, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/071,769

(22) Filed: Mar. 3, 2005

(65) Prior Publication Data

US 2006/0196486 A1    Sep. 7, 2006

(51) Int. Cl.
F02M 25/07 (2006.01)
F02B 47/08 (2006.01)
G06F 19/00 (2006.01)
F02B 33/44 (2006.01)

(52) U.S. Cl. ............ 123/698; 123/568.16; 123/568.21; 701/108

(58) Field of Classification Search ................ 123/674, 123/679, 698, 704, 568.16, 568.21, 680, 123/681; 701/101, 102, 103, 104, 105, 108, 701/109, 114, 115; 60/274, 276, 285, 605.2
See application file for complete search history.

(56) References Cited

U.S. PATENT DOCUMENTS

| | | | |
|---|---|---|---|
| 4,214,308 A | 7/1980 | Carp | 701/114 |
| 4,309,971 A | 1/1982 | Chiesa et al. | 123/480 |
| 4,430,976 A | 2/1984 | Kondo et al. | 123/674 |
| 4,671,107 A | 6/1987 | Chiesa et al. | |
| 5,150,696 A | 9/1992 | Kabasin et al. | 123/680 |
| 5,172,320 A | 12/1992 | Nada | 701/103 |
| 5,359,852 A | 11/1994 | Curran et al. | 60/274 |
| 5,383,333 A | 1/1995 | Logothetis et al. | 60/276 |
| 5,392,598 A | 2/1995 | White et al. | 60/274 |
| 5,392,599 A | 2/1995 | Hamburg et al. | 60/274 |
| 5,515,826 A | 5/1996 | Hamburg et al. | 123/406.47 |
| 5,535,135 A | 7/1996 | Bush et al. | 702/24 |
| 5,720,266 A * | 2/1998 | Nogi et al. | 123/680 |
| 5,806,012 A | 9/1998 | Maki et al. | 701/104 |
| 5,878,717 A | 3/1999 | Zur Love | 123/435 |
| 5,908,463 A | 6/1999 | Akazaki et al. | 701/104 |
| 5,954,039 A | 9/1999 | Doering et al. | 123/692 |
| 6,055,810 A | 5/2000 | Borland et al. | 60/600 |
| 6,073,073 A | 6/2000 | Kitamura et al. | 701/103 |

(Continued)

FOREIGN PATENT DOCUMENTS

EP    892164 A2 *   1/1999   ................ 123/698

(Continued)

Primary Examiner—Willis R. Wolfe, Jr.
(74) Attorney, Agent, or Firm—Barnes & ThornburgLLP

(57) ABSTRACT

A system for controlling the air-to-fuel ratio in an internal combustion engine includes an air intake conduit coupled to an intake manifold, an EGR valve disposed in-line with an EGR conduit responsive to a valve control signal, a lambda sensor producing a lambda signal indicative of the air-to-fuel ratio of the exhaust gas and a control circuit producing the valve control signal as a function of a desired mass air flow value, a desired air-to-fuel ratio, and the lambda signal. In an alternate embodiment, the system further includes a fueling system responsive to a fueling control signal. In this embodiment, the control circuit produces the fueling control signal as a function of a desired fuel control value, a desired air-to-fuel ratio, and the lambda signal. In another alternate embodiment, the control circuit produces the valve control signal as a function of a desired air-to-fuel ratio and the lambda signal.

35 Claims, 4 Drawing Sheets

U.S. PATENT DOCUMENTS

| | | | |
|---|---|---|---|
| 6,227,033 B1 | 5/2001 | Kainz | 73/23.32 |
| 6,304,815 B1* | 10/2001 | Moraal et al. | 701/115 |
| 6,327,847 B1* | 12/2001 | Surnilla et al. | 60/285 |
| 6,378,515 B1* | 4/2002 | Geyer | 123/698 |
| 6,666,201 B1* | 12/2003 | Mazur | 123/698 |
| 6,899,093 B1* | 5/2005 | Center | 123/698 |
| 7,004,156 B1* | 2/2006 | Lee et al. | 123/698 |
| 2002/0139361 A1* | 10/2002 | Itoyama et al. | 123/698 |
| 2003/0066519 A1 | 4/2003 | Wachsman et al. | 123/703 |
| 2003/0192518 A1 | 10/2003 | Gopp et al. | 123/568.21 |
| 2003/0221680 A1* | 12/2003 | Tonetti et al. | 123/698 |

FOREIGN PATENT DOCUMENTS

| | | |
|---|---|---|
| GB | 2259159 | 3/1993 |
| GB | 2373874 | 2/2002 |

* cited by examiner

SYSTEM FOR CONTROLLING EXHAUST EMISSIONS PRODUCED BY AN INTERNAL COMBUSTION ENGINE

FIELD OF THE INVENTION

The present invention relates generally to systems for controlling exhaust emissions produced by an internal combustion engine, and more specifically to systems for controlling exhaust emissions by controlling the air-to-fuel ratio supplied to the engine as a function of one or more engine operating conditions.

BACKGROUND OF THE INVENTION

A number of systems for controlling exhaust emissions produced by an internal combustion engine currently exist. It is desirable with such systems to control the actual air-to-fuel ratio (A/F) of the exhaust emissions by controlling the air and/or fuel supplied to the engine to reach a targeted A/F ratio. Reaching the targeted A/F ratio will provide a number of benefits including, but not limited to, achieving a desired oxides of nitrogen (NOx) production level.

SUMMARY OF THE INVENTION

The present invention may comprise one or more of the features recited in the appended claims or one or more of the following features and combinations thereof. A system for controlling a ratio of air and fuel supplied to an internal combustion engine may comprise of an air intake conduit fluidly coupled to an intake manifold of the engine, an exhaust gas recirculation (EGR) conduit fluidly coupled between an exhaust manifold of the engine and the air intake conduit or the intake manifold, an EGR valve, which may be disposed in-line with the EGR conduit, responsive to a valve control signal to control exhaust gas flow through the EGR conduit, a lambda sensor producing a lambda signal indicative of air-to-fuel ratio of exhaust gas produced by the engine, and a control circuit. The control circuit may produce a desired mass air flow value and a desired air-to-fuel ratio value. The control circuit may further determine a first error value as a difference between the desired air-to-fuel ratio value and the lambda signal. In addition, the control circuit may determine an adjusted mass air flow value as a function of the desired mass air flow value and the first error value. The control circuit may produce the valve control signal as a function of the adjusted mass air flow value.

Alternatively or additionally, a system for controlling a ratio of air and fuel supplied to an internal combustion engine may comprise of a fueling system responsive to a fueling control signal to supply fuel to the engine, a lambda sensor producing a lambda signal indicative of air-to-fuel ratio of exhaust gas produced by the engine, and a control circuit. The control circuit may produce a desired fuel command value and a desired air-to-fuel ratio value. The control circuit may further determine a first error value as a difference between the desired air-to-fuel ratio value and the lambda signal. The control circuit may produce the fueling control signal as a function of the desired fuel command value and the first error value.

Alternatively or additionally, a system for controlling a ratio of air and fuel supplied to an internal combustion engine may comprise of an air intake conduit fluidly coupled to an intake manifold of the engine, an exhaust gas recirculation (EGR) conduit fluidly coupled between an exhaust manifold of the engine and one of the air intake conduit and the intake manifold, an EGR valve, which may be disposed in-line with the EGR conduit, responsive to a valve control signal to control exhaust gas flow through the EGR conduit, a lambda sensor producing a lambda signal indicative of air-to-fuel ratio of exhaust gas produced by the engine, and a control circuit. The control circuit may produce a desired air-to-fuel ratio value. The control circuit may further determine a first error value as a difference between the desired air-to-fuel ratio value and the lambda signal. The control circuit may produce the valve control signal as a function of the first error value.

Alternatively or additionally, a system for controlling a ratio of air and fuel supplied to an internal combustion engine may comprise of an air intake conduit fluidly coupled to an intake manifold of the engine, an exhaust gas recirculation (EGR) conduit fluidly coupled between an exhaust manifold of the engine and one of the air intake conduit and the intake manifold, an EGR valve, which may be disposed in-line with the EGR conduit, responsive to a first control signal to control exhaust gas flow through the EGR conduit, a fueling system responsive to a second control signal to supply fuel to the engine, a lambda sensor producing a lambda signal indicative of air-to-fuel ratio of exhaust gas produced by the engine, and a control circuit. The control circuit may produce a desired air-to-fuel ratio value. The control circuit may further determine a first error value as a difference between the desired air-to-fuel ratio value and the lambda signal. The control circuit may produce the first or second actuator control signals as a function of the first error value.

DESCRIPTION OF THE ILLUSTRATIVE EMBODIMENTS

Figure 1:
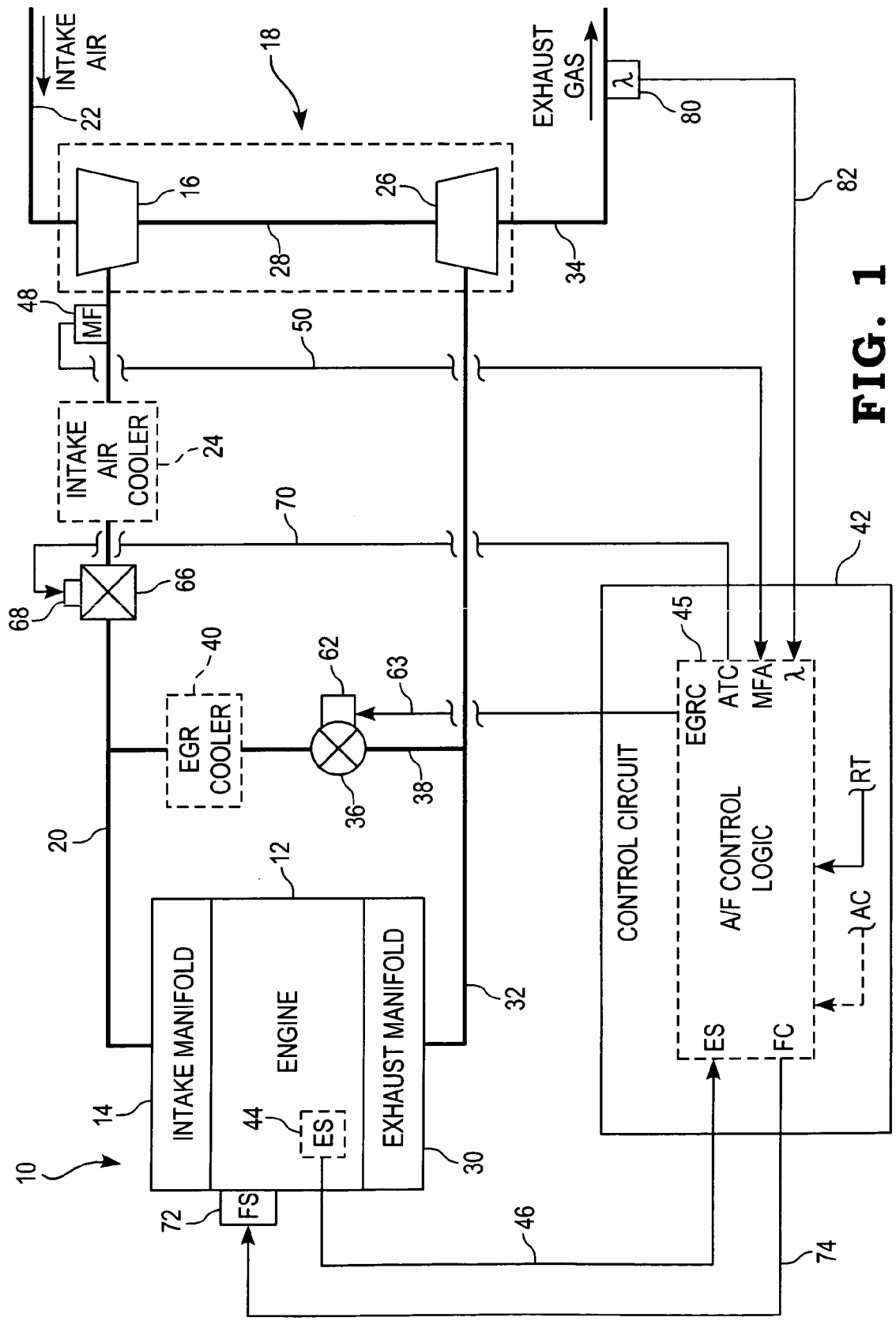
FIG. 1 is a diagrammatic illustration of one illustrative embodiment of a system for determining and adjusting air-to-fuel ratio of the exhaust gas produced by an internal combustion engine.

For the purposes of promoting an understanding of the principles of the invention, reference will now be made to a number of preferred embodiments illustrated in the drawings and specific language will be used to describe the same.

Referring now to FIG. 1, a diagrammatic illustration of one preferred embodiment of a system 10 for controlling the air-to-fuel ratio of exhaust emissions is shown. System 10 includes an internal combustion engine 12 having an intake manifold 14 with an intake conduit 20 attached thereto. The intake conduit 20 may be fluidly coupled to an intake conduit 22 wherein the intake conduit 22 supplies fresh air to intake conduit 20. Optionally, as shown in phantom, the intake conduit 20 may be fluidly coupled to an outlet of a compressor 16 of a turbocharger 18, wherein the compressor 16 includes a compressor inlet coupled to the intake conduit 22 for receiving fresh air therefrom. System 10 further includes an air throttle 66 of known construction disposed in line with intake conduit 20 between the intake manifold 14 and the intake conduit 22. Optionally, as shown in phantom in FIG. 1, system 10 may include an intake air cooler 24 of known construction disposed in line with intake conduit 20 between the intake conduit 22 and the air throttle 66. The engine 12 of system 10 further includes an exhaust manifold 30 having an exhaust conduit 32 attached thereto. The exhaust conduit 32 may be fluidly coupled to an exhaust conduit 34, wherein the exhaust conduit 34 dispenses exhaust gas from engine 12. In embodiments where the system 10 includes the turbocharger 18, the turbocharger compressor 16 may be mechanically coupled to a turbocharger turbine 26 via a drive shaft 28, wherein turbine 26 includes a turbine inlet fluidly coupled to the exhaust manifold 30 of engine 12 via the exhaust conduit 32, and further includes a turbine outlet fluidly coupled to ambient via the exhaust conduit 34. An EGR valve 36 is disposed in-line with an EGR conduit 38 disposed in fluid communication with the intake conduit 20 and the exhaust conduit 32, and an EGR cooler 40 of known construction may optionally be disposed in-line with EGR conduit 38 between EGR valve 36 and intake conduit 20 as shown in phantom in FIG. 1.

System 10 includes a control circuit 42 that is illustratively microprocessor-based and is generally operable to control and manage the overall operation of engine 12. Control circuit 42, in one embodiment, may be a known control unit sometimes referred to as an electronic or engine control module (ECM), electronic or engine control unit (ECU) or the like, or may alternatively be a general purpose or application specific control circuit capable of operation as will be described hereinafter.

Control circuit 42 includes a number of inputs for receiving signals from various sensors or sensing systems associated with system 10. For example, system 10 includes an engine speed sensor 44 electrically connected to an engine speed input, ES, of control circuit 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 further includes a mass air flow sensor 48 disposed in fluid communication with the intake conduit 20 of engine 12, and electrically connected to a mass flow of air input (MFA) of control circuit 42 via signal path 50. Mass air flow sensor 48 may be of known construction, and is operable to produce a mass flow rate signal on signal path 50 indicative of the mass flow rate of fresh air flowing into the intake conduit 20.

System 10 further includes a lambda sensor 80 disposed in fluid communication with exhaust conduit 34 and electrically connected to a lambda input (λ) of control circuit 42 via signal path 82, as shown in FIG. 1. In one embodiment, lambda sensor 80 may be an oxygen sensor producing an oxygen signal corresponding to the oxygen content of the exhaust gas on signal path 82. In any case, lambda sensor 80 may be of known construction to those skilled in the art, and is operable to produce an air to fuel signal on signal path 82 indicative of the of the air to fuel ratio of the exhaust gas produced by engine 12.

Control circuit 42 also includes a number of outputs for controlling one or more air handling mechanisms associated with system 10. For example, EGR valve 36 includes an EGR valve actuator 62 electrically connected to an EGR valve control output (EGRC) of control circuit 42 via signal path 63. Control circuit 42 is operable in a known manner to produce an EGR valve control signal on signal path 63, and EGR valve actuator 62 is responsive to the EGR valve control signal on signal path 63 to control the position of EGR valve 36 relative to a reference position. In addition, air throttle 66 includes an air throttle actuator 68 electrically connected to an air throttle control output (ATC) of control circuit 42 via signal path 70. Control circuit 42 is operable in a known manner to produce an air throttle control signal on signal path 70, and air throttle actuator 68 is responsive to the air throttle control signal on signal path 70 to control the position of air throttle 66 relative to a reference position.

System 10 further includes a fueling system 72 electrically connected to a fuel command output (FC) of control computer 42 via signal path 74. Fueling system 72 is responsive to fueling control signals produced by control circuit 42 on signal path 74 to supply fuel to engine 12, and control circuit 42 is operable to produce such fueling control signals in a manner well-known in the art.

Control circuit 42 generates a number of conventional control values that are used by the A/F control logic block 45. For example, the A/F control logic 45 receives an air command value (AC), which is generated internally in control circuit 42 in a known manner. The air command value (AC) is described in U.S. Pat. No. 6,732,522 issued to Wright et. al which is incorporated herein by reference. A/F control logic 45 also receives a requested torque value (RT). The requested toque value (RT), which is also described in U.S. Pat. No. 6,732,522 issued to Wright et al., is a commanded toque valued based on operator requested fueling.

Control circuit 42 includes an A/F control logic block 45 configured to control the ratio of air and fuel supplied to the engine 12 as will be more fully described hereinafter.

Figure 2:
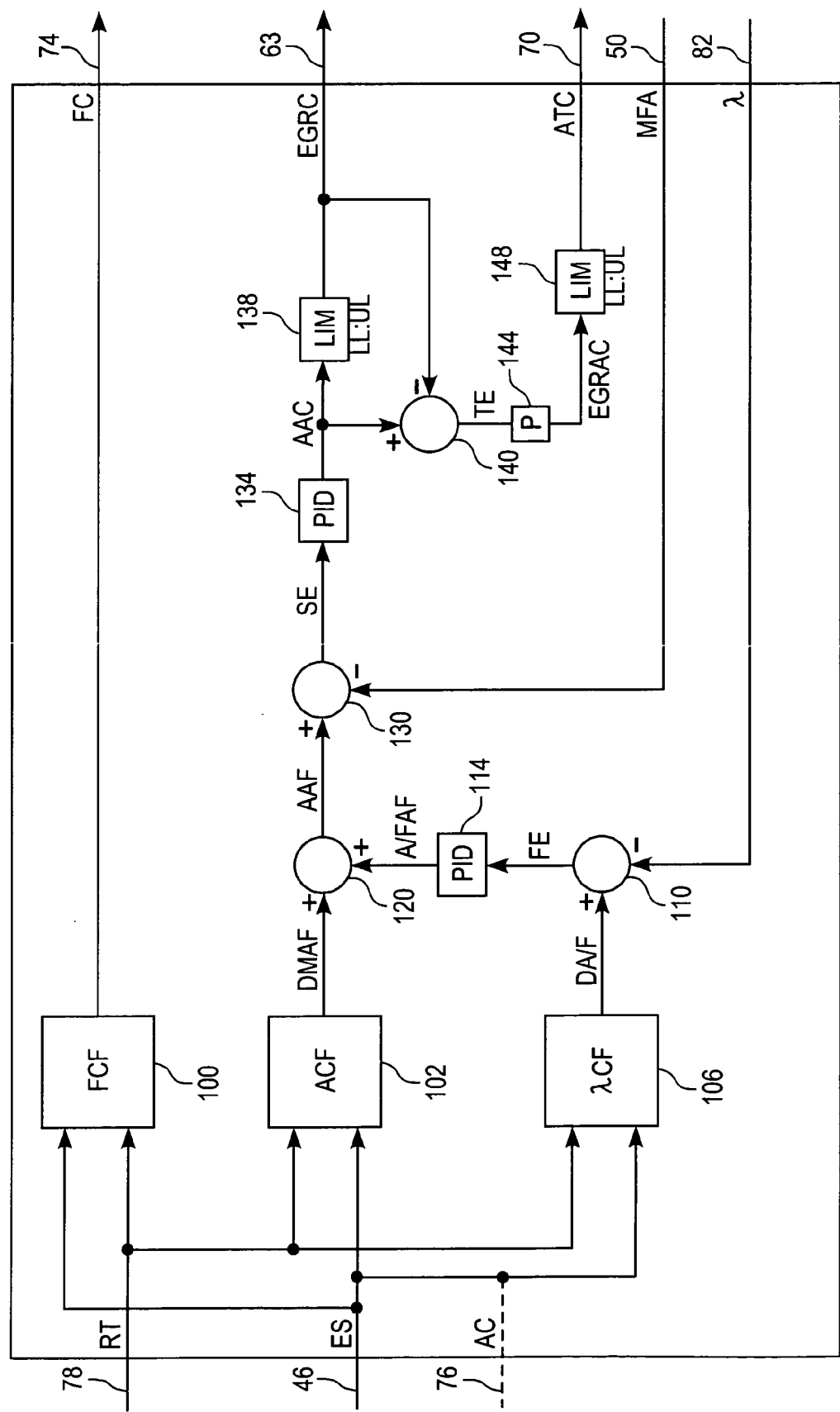
FIG. 2 is a diagrammatic illustration of one illustrative embodiment of the A/F control logic block of FIG. 1.

Referring now to FIG. 2, a block diagram is shown illustrating one illustrative embodiment of A/F control logic block 45 in control circuit 42 of FIG. 1. A/F control logic block 45 includes a fuel command function block 100 receiving the engine speed signal (ES) from engine speed sensor 44 via signal path 46 as well as the requested torque value (RT) generated internal to the control circuit 42. Fuel command function block 100 is responsive to the ES signal on signal path 46 as well as the RT value to compute a fueling control signal (FC). Fuel command function block 100 may include any number of mapping functions, equations, graphs, tables, or any other techniques known to those skilled in the art to compute the fueling control signal.

A/F control logic block 45 further includes an air command function block 102 receiving the engine speed signal from engine speed sensor 44 via signal path 46 as well as the requested torque value (RT). Air command function block 102 is responsive to the engine speed signal via signal path 46 as well as the requested torque value (RT) to compute a desired mass air flow value (DMAF). Alternatively, as shown in phantom, air command function block 102 may received the air command value (AC) as well as the requested torque value (RT) to compute the desired mass air flow value (DMAF). Air command function block 102 may include any number of mapping functions, equations, graphs, tables, or any other techniques known to those skilled in the art to compute the desired mass air flow value (DMAF). The desired mass air flow value (DMAF) may then be used to determine the EGR valve control signal on signal path 63, which will be described in more detail later.

A/F control logic block 45 further includes a lambda command function 106 receiving the engine speed signal (ES) from engine speed sensor 44 via signal path 46 as well as the requested torque value (RT). Lambda command function 106 is responsive to the engine speed signal on signal path 46 as well as the requested torque value (RT) to compute a desired air-to-fuel ratio value (DA/F). Alternatively, as shown in phantom, lambda command function 106 may receive and respond to the air command value (AC) as well as the requested torque value (RT) to compute the desired air-to-fuel ratio value (DA/F). The desired air-to-fuel ratio value (DA/F) may be expressed in terms of a desired oxygen content of a charge supplied to the intake manifold 14 where the charge comprises of fresh air supplied by the air intake conduit 22 and recirculated exhaust gas supplied by the EGR conduit 38. Lambda command function 106 may include any number of mapping functions, equations, graphs, tables, or any other techniques known to those skilled in the art to compute the desired air-to-fuel ratio value (DA/F). The desired air-to-fuel ratio value (DA/F) may then be used to adjust the EGR valve control signal on signal path 63, which will be described in more detail later.

A/F control logic block 45 further includes first arithmetic block 110 having an addition input receiving the desired air-to-fuel ratio value (DA/F) from lambda control function 106, and a subtraction input receiving the lambda signal from lambda sensor 80 via signal path 82. First arithmetic block 110, which may be but is not limited to a standard adder and subtractor, an arithmetic logic unit, or any other means known to those skilled in the art, computes first error value (FE) as the difference between the desired air-to-fuel ratio value (DA/F) and the lambda signal via signal path 82. The first arithmetic block calculates the error between the desired air-to-fuel ratio which should be emitted from the exhaust of the engine and the actual air-to-fuel ratio being emitted from the exhaust of the engine.

A/F control logic block 45 further includes first controller 114. First controller 114 receives first error value (FE) and computes an air-to-fuel adjusted mass flow value (A/FAF). First controller 114 may convert first error value (FE) from a unitless measurement to the air-to-fuel adjusted mass flow value (A/FAF), which may be expressed in terms of lbs./min. First controller 114 may be but is not limited a proportional-integral-derivative controller, or any other suitable controller well-known to those skilled in the art.

A/F control logic block 45 further includes second arithmetic block 120 having an addition input receiving the desired mass air flow value (DMAF) from air command function block 102, and a addition input receiving the air-to-fuel adjusted mass flow value (A/FAF). Second arithmetic block 120, which may be but is not limited to a standard adder, an arithmetic logic unit, or any other means known to those skilled in the art, computes an adjusted mass air flow value (AAF) as the addition of the desired mass air flow value (DMAF) and the air-to-fuel adjusted mass flow value (A/FAF). The second arithmetic block adjusts the desired mass air flow value by the error value measured from the actual air-to-fuel ratio of the exhaust emissions in an outer feedback loop of the two-loop feedback system.

A/F control logic block 45 further includes third arithmetic block 130 having an addition input receiving the adjusted mass air flow value (AAF), and a subtraction input receiving the mass air flow signal from mass air flow sensor 48 via signal path 50. Third arithmetic block 130, which may be but is not limited to a standard adder and subtractor, an arithmetic logic unit, or any other means known to those skilled in the art, computes a second error value (SE) as the difference between the adjusted mass air flow value (AAF) and the mass air flow signal via signal path 50. The third arithmetic block further adjusts the mass air flow value by the actual mass flow of fresh air being supplied to the intake manifold in the inner feedback loop of the two-loop feedback system.

A/F control logic block 45 further includes a second controller 134 and a first limiter 138. Second controller 134 receives second error value (SE) and computes a mass air flow adjusted actuator command value (AAC). Second controller 134 may be used to control the second error value (SE) such that the mass air flow adjusted actuator command value (AAC) remains continuous rather than oscillating. In addition, second controller 134 may be used to compute the mass air flow adjusted actuator command value (AAC) by adjusting the current second error value (SE) based on a predetermined set point and adding that adjusted value to the last outputted mass air flow adjusted actuator command value (AAC). Second controller 134 may be but is not limited a proportional-integral-derivative controller, or any other suitable controller well-known to those skilled in the art. First limiter 138 receives the mass air flow adjusted actuator command value (AAC) from second controller 134 and produces the valve control signal on signal path 63 therefrom. First limiter 138 limits the valve control signal to a predefined minimum and maximum valve position values such that, if the mass air flow adjusted actuator command value (AAC) exceeds the predefined maximum valve position value, the first limiter 138 outputs the predefined maximum valve position value and similarly, if the mass flow adjusted actuator command value (AAC) falls below the predefined minimum valve position value, the first limiter 138 outputs the predefined minimum valve position value. The predefined maximum and minimum values may be based on the open and closed positions of the EGR valve 36, such that the control signal on signal path 63 may not exceed the value for opening the valve completely or fall below the value for closing the valve completely. In any case, first limiter 138 limits how much the EGR valve 36 may be opened and closed using the predefined maximum and minimum valve position values.

A/F control logic block 45 further includes a fourth arithmetic block 140 having an addition input receiving the mass air flow adjusted actuator command value (AAC), and a subtraction input receiving the valve control signal via signal path 63. Fourth arithmetic block 140, which may be but is not limited to a standard adder and subtractor, an arithmetic logic unit, or any other means known to those skilled in the art, computes a third error value (TE) as the difference between the mass air flow adjusted actuator command value (AAC) and the valve control signal on signal path 63. The fourth arithmetic block 140 may be used to help determine when air throttle 66 may be actuated and will be described in more detail later.

A/F control logic block 45 further includes a third controller 144 and a second limiter 148. Third controller 144 receives third error value (TE) and computes an EGR valve command adjusted actuator command value (EGRAC). Third controller 144 may be used to control the third error value (TE) such that the EGR valve command adjusted actuator command value (EGRAC) remains continuous rather than oscillating. In addition, third controller 144 may be used to compute the EGR valve command adjusted actuator command value (EGRAC) by adjusting the current third error value (TE) based on a predetermined set point and adding that adjusted value to the last outputted EGR valve command adjusted actuator command value (EGRAC). Third controller 144 may be but is not limited a proportional controller, or any other suitable controller well-known to those skilled in the art. Second limiter 148 receives the EGR valve command adjusted actuator command value (EGRAC) from third controller 144 and produces the air throttle control (ATC) signal on signal path 70 therefrom. Second limiter 148 limits the air throttle control signal to a predefined minimum and maximum throttle position values such that, if the EGR valve command adjusted actuator command value (EGRAC) exceeds the predefined maximum throttle position value, the second limiter 148 outputs the predefined maximum throttle position value and similarly, if EGR valve command adjusted actuator command value (EGRAC) falls below the predefined minimum throttle position value, the second limiter 148 outputs the predefined minimum throttle position value. The predefined maximum and minimum throttle position values may be based on the open and closed positions of the air throttle, to allow more fresh air into the intake conduit 20 in a manner known to those skilled in the art. In any case, third limiter 148 limits how much the air throttle 66 may be opened and closed using the predefined maximum and minimum throttle position values. In operation, the air throttle 66 is actuated based on the EGR valve control signal on signal path 63 such that when the EGR valve control signal on signal path 63 reaches its predefined maximum valve position value during fed back into fourth arithmetic block 140, air throttle 66 opens up to allow more fresh air flow into intake conduit 20.

Figure 3:
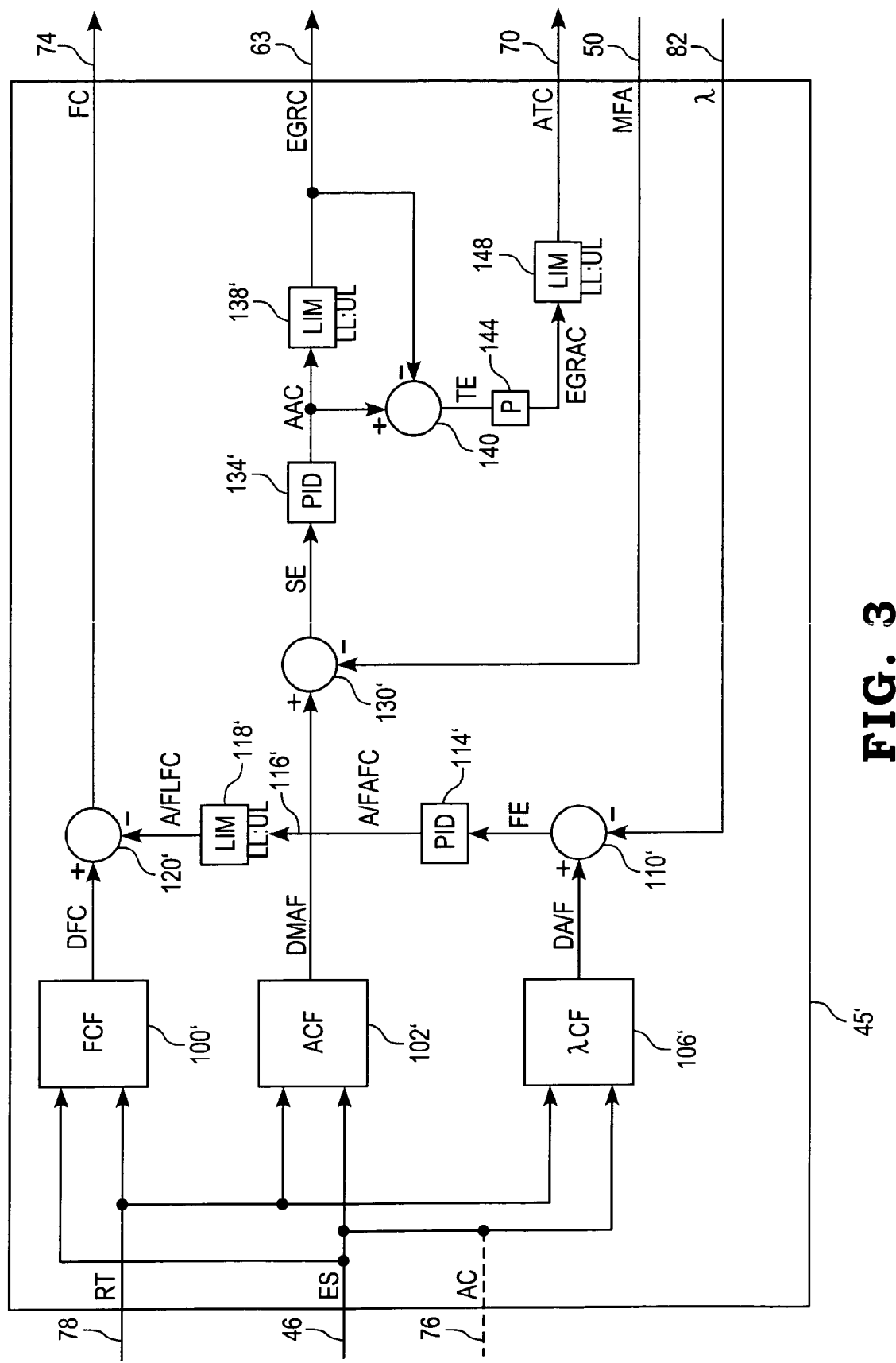
FIG. 3 is a diagrammatic illustration of an alternate embodiment of the A/F control logic block of FIG. 1.

Referring now to FIG. 3, a block diagram is shown illustrating an alternate embodiment of A/F control logic block 45 in control circuit 42 of FIG. 1. A/F control logic block 45' includes a fuel command function block 100' receiving the engine speed signal (ES) from engine speed sensor 44 via signal path 46 as well as the requested torque value (RT). Fuel command function block 100' is responsive to the engine speed signal (ES) on signal path 46 as well as the requested torque value (RT) to compute a desired fuel control value (DFC). Fuel command function block 100' may include any number of mapping functions, equations, graphs, tables, or any other techniques known to those skilled in the art to compute the desired fuel control value (DFC). The desired fuel control value (DFC) is a function of the fueling control signal provided on signal path 74, which is used to supply fuel to engine 12. The desired fuel control value (DFC) and fueling control signal on signal path 74 will be described in greater detail later.

A/F control logic block 45' further includes an air command function block 102' receiving the engine speed signal from engine speed sensor 44 via signal path 46 as well as the requested torque value (RT). Air command function block 102' is responsive to the engine speed signal via signal path 46 as well as the requested torque value (RT) to compute an a desired mass air flow value (DMAF). Alternatively, as shown in phantom, air command function may received the air command value (AC) as well as the requested torque value (RT) to compute the desired mass air flow value (DMAF). Air command function block 102' may include any number of mapping functions, equations, graphs, tables, or any other techniques known to those skilled in the art to compute the desired mass air flow value (DMAF). The desired mass air flow value (DMAF) may then be used to determine the EGR valve control signal on signal path 63, which will be described in more detail later.

A/F control logic block 45' further includes a lambda command function 106' receiving the engine speed signal (ES) from engine speed sensor 44 via signal path 46 as well as the requested torque value (RT). Lambda command function 106' is responsive to the ES signal on signal path 46 as well as the RT value to compute a desired air-to-fuel ratio value (DA/F). Alternatively, as shown in phantom, lambda command function 106' may receive and respond to the air command value (AC) as well as the requested torque value (RT) to compute the desired air-to-fuel ratio value (DA/F). The desired air-to-fuel ratio value (DA/F) may be expressed in terms of a desired oxygen content of a charge supplied to the intake manifold 14 where the charge comprises of fresh air supplied by the air intake conduit 22 and recirculated exhaust gas supplied by the EGR conduit 38. Lambda command function 106' may include any number of mapping functions, equations, graphs, tables, or any other techniques known to those skilled in the art to compute the desired air-to-fuel ratio value (DA/F). The desired air-to-fuel ratio value (DA/F) may then be used to adjust the fueling control signal on signal path 74, which will be described in more detail later.

A/F control logic block 45' further includes first arithmetic block 110' having an addition input receiving the desired air-to-fuel ratio value (DA/F) from lambda command function 106, and a subtraction input receiving the lambda signal from lambda sensor 80 via signal path 82. First arithmetic block 110', which may be but is not limited to a standard adder and subtractor, an arithmetic logic unit, or any other means known to those skilled in the art, computes first error value (FE) as the difference between the desired air-to-fuel ratio value (DA/F) and the lambda signal via signal path 82. The first arithmetic block calculates the error between the desired air-to-fuel ratio which should be emitted from the exhaust of the engine and the actual air-to-fuel ratio being emitted from the exhaust of the engine.

A/F control logic block 45' further includes controller 114' and a limiter 118'.

Controller 114' receives first error value (FE) and computes an air-to-fuel adjusted fuel control value (A/FAFC). Controller 114' may convert first error value (FE) from a unitless measurement to the air-to-fuel adjusted fuel control value (A/FAFC), which may be expressed in terms known to those skilled in the art. Controller 114' may be but is not limited a proportional-integral-derivative controller, or any other suitable controller well-known to those skilled in the art. Limiter 118' receives the air-to-fuel adjusted fuel control value (A/FAFC) from controller 114' and produces an air-to-fuel limited fuel control value (A/FLFC) therefrom. Limiter 118' limits the air-to-fuel adjusted fuel control value (A/FAFC) to a predefined minimum and maximum values such that, if the air-to-fuel adjusted fuel control value (A/FAFC) exceeds the predefined maximum fuel control value, the limiter 118' outputs the predefined maximum fuel control value and similarly, if the air-to-fuel adjusted fuel control value (A/FAFC) falls below the predefined minimum fuel control value, the limiter 118' outputs the predefined minimum fuel control value. The predefined maximum and minimum fuel control values may be calculated such that, the desired fuel control value (DFC) can only be adjusted by limited range corresponding to the air-to-fuel limited fuel control value (A/FLFC) when computing the fueling control signal on signal path 74. In any case, limiter 118' limits how much the desired fuel control value (DFC) may be adjusted using the predefined maximum and minimum fuel control values.

A/F control logic block 45' further includes second arithmetic block 120' having an addition input receiving the desired fuel control value (DFC) from air command function block 102', and a subtraction input receiving the air-to-fuel limited fuel control value (A/FLFC). Second arithmetic block 120', which may be but is not limited to a standard adder and subtractor, an arithmetic logic unit, or any other means known to those skilled in the art, computes the fueling control signal on signal path 74 as the difference between the desired fuel control value (DFC) and the air-to-fuel limited fuel control value (A/FLFC). The second arithmetic block adjusts the fueling control signal by the error value measured from the actual air-to-fuel ratio of the exhaust emissions in an outer feedback loop of the two-loop feedback system.

A/F control logic block 45' further includes third arithmetic block 130' having an addition input receiving the desired mass air flow value (DMAF), and a subtraction input receiving the mass air flow signal from mass air flow sensor 48 via signal path 50. Third arithmetic block 130', which may be but is not limited to a standard adder and subtractor, an arithmetic logic unit, or any other means known to those skilled in the art, computes a second error value (SE) as the difference between the mass air flow value (DMAF) and the mass air flow signal via signal path 50. The third arithmetic block adjusts the desired mass air flow value by the actual mass flow of fresh air being supplied to the intake manifold in the inner feedback loop of the two-loop feedback system.

A/F control logic block 45' further includes a first controller 134' and a first limiter 138'. First controller 134' receives second error value (SE) and computes a mass air flow adjusted actuator command value (AAC). First controller 134' may be used to control the second error value (SE) such that the mass air flow adjusted actuator command value (AAC) remains continuous rather than oscillating. In addition, first controller 134' may be used to compute the mass air flow adjusted actuator command value (AAC) by adjusting the current second error value (SE) based on a predetermined set point and adding that adjusted value to the last outputted mass air flow adjusted actuator command value (AAC). First controller 134' may be but is not limited a proportional-integral-derivative controller, or any other suitable controller well-known to those skilled in the art. First limiter 138' receives the mass air flow adjusted actuator command value (AAC) from first controller 134' and produces the valve control signal on signal path 63 therefrom. First limiter 138' limits the valve control signal to a predefined minimum and maximum valve position values such that, if the mass air flow adjusted actuator command value (AAC) exceeds the predefined maximum valve position value, the first limiter 138' outputs the predefined maximum valve position value and similarly, if the mass flow adjusted actuator command value (AAC) falls below the predefined minimum valve position value, the first limiter 138' outputs the predefined minimum valve position value. The predefined maximum and minimum values may be based on the open and closed positions of the EGR valve 36, such that the control signal on signal path 63 may not exceed the value for opening the valve completely or fall below the value for closing the valve completely. In any case, first limiter 138' limits how much the EGR valve 36 may be opened and closed using the predefined maximum and minimum valve position values.

A/F control logic block 45' further includes a fourth arithmetic block 140' having an addition input receiving the mass air flow adjusted actuator command value (AAC), and a subtraction input receiving the valve control signal via signal path 63. Fourth arithmetic block 140', which may be but is not limited to a standard adder and subtractor, an arithmetic logic unit, or any other means known to those skilled in the art, computes a third error value (TE) as the difference between the mass air flow adjusted actuator command value (AAC) and the valve control signal on signal path 63. The fourth arithmetic block 140 may be used to help determine when air throttle 66 may be actuated and will be described in more detail later.

A/F control logic block 45' further includes a second controller 144' and a second limiter 148'. Second controller 144' receives third error value (TE) and computes an EGR valve command adjusted actuator command value (EGRAC). Second controller 144' may be used to control the third error value (TE) such that the EGR valve command adjusted actuator command value (EGRAC) remains continuous rather than oscillating. In addition, second controller 144' may be used to compute the EGR valve command adjusted actuator command value (EGRAC) by adjusting the current third error value (TE) based on a predetermined set point and adding that adjusted value to the last outputted EGR valve command adjusted actuator command value (EGRAC). Second controller 144' may be but is not limited a proportional controller, or any other suitable controller well-known to those skilled in the art. Second limiter 148' receives the EGR valve command adjusted actuator command value (EGRAC) from second controller 144' and produces the air throttle control (ATC) signal on signal path 70 therefrom. Second limiter 148' limits the air throttle control signal to a predefined minimum and maximum throttle position values such that, if the EGR valve command adjusted actuator command value (EGRAC) exceeds the predefined maximum throttle position value, the second limiter 148' outputs the predefined maximum throttle position value and similarly, if EGR valve command adjusted actuator command value (EGRAC) falls below the predefined minimum throttle position value, the second limiter 148' outputs the predefined minimum throttle position value. The predefined maximum and minimum throttle position values may be based on the open and closed positions of the air throttle, to allow more fresh air into the intake conduit 20 in a manner known to those skilled in the art. In any case, second limiter 148' limits how much the air throttle 66 may be opened and closed using the predefined maximum and minimum throttle position values. In operation, the air throttle 66 is actuated based on the EGR valve control signal on signal path 63 such that when the EGR valve control signal on signal path 63 reaches its predefined maximum valve position value during fed back into fourth arithmetic block 140, air throttle 66 opens up to allow more fresh air flow into intake conduit 20.

Figure 4:
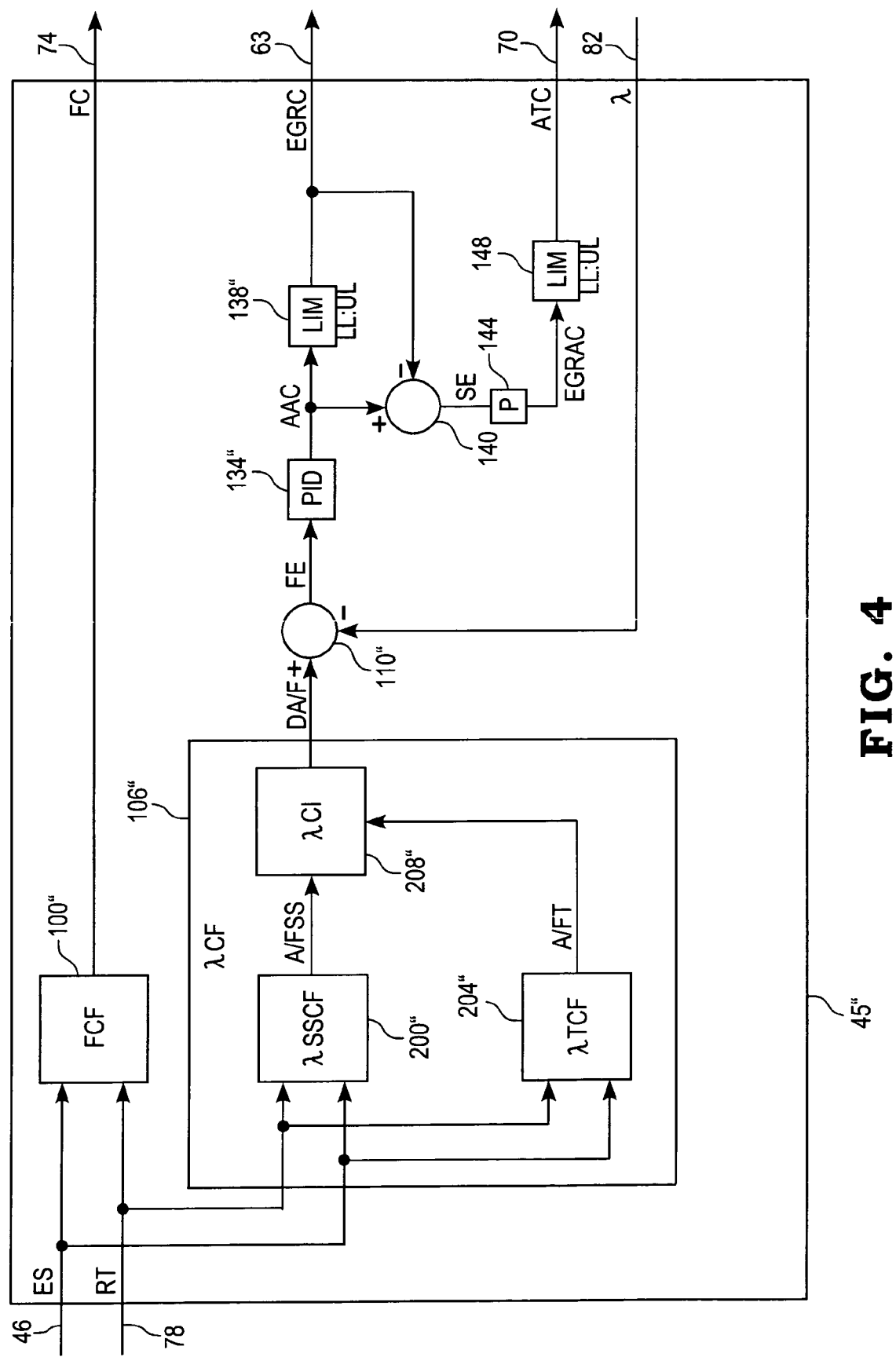
FIG. 4 is a diagrammatic illustration of another alternate embodiment of the A/F control logic block of FIG. 1.

Referring now to FIG. 4, a block diagram is shown illustrating another alternate embodiment of A/F control logic block 45 in control circuit 42 of FIG. 1. A/F control logic block 45" includes a fuel command function block 100" receiving the engine speed signal (ES) from engine speed sensor 44 via signal path 46 as well as the requested torque value (RT). Fuel command function block 100" is responsive to the engine speed signal on signal path 46 as well as the requested torque value (RT) to compute a fueling control signal (FC). Fuel command function block 100" may include any number of mapping functions, equations, graphs, tables, or any other techniques known to those skilled in the art to compute the fueling control signal. The fueling control signal, FC, is then provided on signal path 74 by fuel command function block 100" to supply fuel to engine 12.

A/F control logic block 45" further includes a lambda command function 106" receiving the engine speed signal (ES) from engine speed sensor 44 via signal path 46 as well as the requested torque value (RT) and computing a desired air-to-fuel ratio value (DA/F). To compute a desired air-to-fuel ratio value (DA/F), lambda command function block 106" further includes a lambda steady-state control function block 200" and a lambda transient control function block 204". Lambda steady-state control function block 200" receives and is responsive to the engine speed signal on signal path 46 as well as the requested torque value (RT) to produce an air-to-fuel steady-state value (A/FSS). Lambda steady-state control function block 200" may include any number of mapping functions, equations, graphs, tables, or any other techniques known to those skilled in the art to compute the air-to-fuel steady state value (A/FSS). Similarly, lambda transient control function block 204" receives and is responsive to the engine speed signal on signal path 46 as well as the requested torque value (RT) to produce an air-to-fuel transient value (A/FT). Lambda transient control function block 204" may include any number of mapping functions, equations, graphs, tables, or any other techniques known to those skilled in the art to compute the air-to-fuel transient value (A/FT). Lambda control function 106" further includes a lambda control interpolation block 208" receiving the air-to-fuel steady-state value (A/FSS) as well as the air-to-fuel transient value (A/FT). Lambda control interpolation block 208" is responsive to the air-to-fuel steady state value (A/FSS) as well as the air-to-fuel transient value (A/FT) to compute the desired air-to-fuel ratio value (DA/F). Lambda control interpolation block 208" may include any number of mapping functions, equations, graphs, tables, or any other techniques known to those skilled in the art to compute the desired air-to-fuel ratio value (DA/F). In one embodiment, the lambda control interpolation block 208" may produce the desired air-to-fuel ratio value (DA/F) as a function of the following equation:

$$DA/F = \alpha*(A/FSS) + (1-\alpha)*(A/FT), \text{ where } \alpha \text{ takes a value between } [0\ 1].$$

A/F control logic block 45" further includes first arithmetic block 110" having an addition input receiving the desired air-to-fuel ratio value (DA/F) from lambda control function block 106", and a subtraction input receiving the lambda signal from lambda sensor 80 via signal path 82. First arithmetic block 110", which may be but is not limited to a standard adder and subtractor, an arithmetic logic unit, or any other means known to those skilled in the art, computes first error value (FE) as the difference between the desired air-to-fuel ratio value (DA/F) and the lambda signal via signal path 82. The first arithmetic block calculates the error between the desired air-to-fuel ratio which should be emitted from the exhaust of the engine and the actual air-to-fuel ratio being emitted from the exhaust of the engine in the feedback loop of the system.

A/F control logic block 45" further includes a first controller 134" and a first limiter 138". First controller 134" receives first error value (FE) and computes a mass air flow adjusted actuator command value (AAC). First controller 134" may convert first error value (FE) from a unitless measurement to the mass air flow adjusted actuator command value (AAC), which may be expressed in terms of lbs./min. First controller 134" may be used to control the first error value (FE) such that the mass air flow adjusted actuator command value (AAC) remains continuous rather than oscillating. In addition, first controller 134" may be used to compute the mass air flow adjusted actuator command value (AAC) by adjusting the current first error value (FE) based on a predetermined set point and adding that adjusted value to the last outputted mass air flow adjusted actuator command value (AAC). First controller 134" may be but is not limited a proportional-integral-derivative controller, or any other suitable controller well-known to those skilled in the art. First limiter 138" receives the mass air flow adjusted actuator command value (AAC) from first controller 134" and produces the valve control signal on signal path 63 therefrom. First limiter 138" limits the valve control signal to a predefined minimum and maximum valve position values such that, if the mass air flow adjusted actuator command value (AAC) exceeds the predefined maximum valve position value, the first limiter 138" outputs the predefined maximum valve position value and similarly, if the mass flow adjusted actuator command value (AAC) falls below the predefined minimum valve position value, the first limiter 138" outputs the predefined minimum valve position value. The predefined maximum and minimum values may be based on the open and closed positions of the EGR valve 36, such that the control signal on signal path 63 may not exceed the value for opening the valve completely or fall below the value for closing the valve completely. In any case, first limiter 138" limits how much the EGR valve 36 may be opened and closed using the predefined maximum and minimum valve position values.

A/F control logic block 45" further includes a second arithmetic block 140" having an addition input receiving the mass air flow adjusted actuator command value (AAC), and a subtraction input receiving the valve control signal via signal path 63. Second arithmetic block 140", which may be but is not limited to a standard adder and subtractor, an arithmetic logic unit, or any other means known to those skilled in the art, computes a second error value (SE) as the difference between the mass air flow adjusted actuator command value (AAC) and the valve control signal on signal path 63. The fourth arithmetic block 140 may be used to help determine when air throttle 66 may be actuated and will be described in more detail later.

A/F control logic block 45" further includes a second controller 144" and a second limiter 148". Second controller 144" receives second error value (SE) and computes an EGR valve command adjusted actuator command value (EGRAC). Second controller 144" may be used to control the second error value (SE) such that the EGR valve command adjusted actuator command value (EGRAC) remains continuous rather than oscillating. In addition, second controller 144" may be used to compute the EGR valve command adjusted actuator command value (EGRAC) by adjusting the current second error value (SE) based on a predetermined set point and adding that adjusted value to the last outputted EGR valve command adjusted actuator command value (EGRAC). Second controller 144" may be but is not limited a proportional controller, or any other suitable controller well-known to those skilled in the art. Second limiter 148" receives the EGR valve command adjusted actuator command value (EGRAC) from second controller 144" and produces the air throttle control (ATC) signal on signal path 70 therefrom. Second limiter 148" limits the air throttle control signal to a predefined minimum and maximum throttle position values such that, if the EGR valve command adjusted actuator command value (EGRAC) exceeds the predefined maximum throttle position value, the second limiter 148" outputs the predefined maximum throttle position value and similarly, if EGR valve command adjusted actuator command value (EGRAC) falls below the predefined minimum throttle position value, the second limiter 148" outputs the predefined minimum throttle position value. The predefined maximum and minimum throttle position values may be based on the open and closed positions of the air throttle, to allow more fresh air into the intake conduit 10 in a manner known to those skilled in the art. In any case, second limiter 148" limits how much the air throttle 66 may be opened and closed using the predefined maximum and minimum throttle position values. In operation, the air throttle 66 is actuated based on the EGR valve control signal on signal path 63 such that when the EGR valve control signal on signal path 63 reaches its predefined maximum valve position value during fed back into fourth arithmetic block 140'', air throttle 66 opens up to allow more fresh air flow into intake conduit 20.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for controlling a ratio of air and fuel supplied to an internal combustion engine, the system comprising:
    an air intake conduit fluidly coupled to an intake manifold of the engine,
    an exhaust gas recirculation (EGR) conduit fluidly coupled between an exhaust manifold of the engine and one of the air intake conduit and the intake manifold,
    an EGR valve disposed in-line with the EGR conduit, the EGR valve responsive to a valve control signal to control exhaust gas flow through the EGR conduit,
    a lambda sensor producing a lambda signal indicative of air-to-fuel ratio of exhaust gas produced by the engine, and
    a control circuit producing a desired mass air flow value and a desired air-to-fuel ratio value, the control circuit determining a first error value as a difference between the desired air-to-fuel ratio value and the lambda signal and determining an adjusted mass air flow value as a function of the desired mass air flow value and the first error value, the control circuit producing the valve control signal as a function of the adjusted mass air flow value.

2. The system of claim 1 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit,
    wherein the control circuit is further configured to produce the throttle control signal as a function of the adjusted mass air flow value and the valve control signal.

3. The system of claim 1 wherein the lambda sensor comprises an oxygen sensor producing an oxygen signal corresponding to an oxygen content of the exhaust gas,
    and wherein the desired air-to-fuel ratio value is expressed in terms of a desired oxygen content of a charge supplied to the intake manifold, the charge comprising fresh air supplied to the intake manifold via the air intake manifold and recirculated exhaust gas supplied to the intake manifold by the EGR conduit.

4. The system of claim 1 further including a mass air flow sensor in fluid communication with the air intake conduit upstream of the junction of the EGR conduit and the one of the air intake conduit and the intake manifold, the mass air flow sensor producing a mass air flow signal indicative of a mass flow of air through the air intake conduit,
    wherein the control circuit is configured to determine a second error value as a difference between the adjusted mass air flow value and the mass air flow signal, and to produce the valve control signal as a function of the second error value.

5. The system of claim 4 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit,
    wherein the control circuit is configured to produce the throttle control signal as a function of the second error value and the valve control signal.

6. The system of claim 1 further including an engine speed sensor producing an engine speed signal indicative of rotational speed of the engine,
    and wherein the control circuit is configured to determine the desired mass air flow value as a function of the engine speed signal and a requested torque value.

7. The system of claim 6 wherein the control circuit is further configured to determine the desired air-to-fuel ratio value as a function of the engine speed signal and the requested torque value.

8. The system of claim 6 wherein the control circuit is further configured to determine the desired air-to-fuel ratio value as a function of the requested torque value and an air command value.

9. The system of claim 1 wherein the control circuit includes a first controller producing an air-to-fuel adjusted mass air flow value as a function of the first error value, the control circuit determining the adjusted mass air flow value as a sum of the desired mass air flow value and the air-to-fuel adjusted mass air flow value.

10. The system of claim 9 wherein the first controller is a proportional-integral-derivative controller.

11. The system of claim 9 further including a mass air flow sensor in fluid communication with the air intake conduit upstream of the junction of the EGR conduit and the one of the air intake conduit and the intake manifold, the mass air flow sensor producing a mass air flow signal indicative of a mass flow of air through the air intake conduit,
    wherein the control circuit is configured to determine a second error value as a difference between the adjusted mass air flow value and the mass air flow signal, and to produce the valve control signal as a function of the second error value.

12. The system of claim 11 wherein the control circuit includes:
    a second controller producing a mass air flow adjusted actuator command value as a function of the second error value, and
    a first limiter producing the valve control signal as a function of the mass air flow adjusted actuator command value, the first limiter limiting the valve control signal to predefined minimum and maximum valve position values.

13. The system of claim 12 wherein the second controller is a proportional-integral-derivative controller.

14. The system of claim 12 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit,
    wherein the control circuit is further configured to produce the throttle control signal as a function of the mass air flow adjusted actuator command value and the valve control signal.

15. The system of claim 14 wherein the control circuit further includes a third controller producing an EGR valve command adjusted actuator command value as a function of a third error value, the third error value being calculated as a difference between the mass air flow adjusted actuator command value and the valve control signal, and a second limiter producing the throttle control signal as a function of the EGR valve command adjusted actuator command value, the second limiter limiting the throttle control signal to predefined minimum and maximum throttle position values.

16. The system of claim 15 wherein the third controller is a proportional controller.

17. A system for controlling a ratio of air and fuel supplied to an internal combustion engine, the system comprising:
an air intake conduit fluidly coupled to an intake manifold of the engine,
an exhaust gas recirculation (EGR) conduit fluidly coupled between an exhaust manifold of the engine and one of the air intake conduit and the intake manifold,
an EGR valve disposed in-line with the EGR conduit, the EGR valve responsive to a valve control signal to control exhaust gas flow through the EGR conduit,
a lambda sensor producing a lambda signal indicative of air-to-fuel ratio of exhaust gas produced by the engine, and
a control circuit producing a desired air-to-fuel ratio value, the control circuit determining a first error value as a difference between the desired air-to-fuel ratio value and the lambda signal, the control circuit producing the valve control signal as a function of the first error value,
wherein the desired air-to-fuel ratio value is expressed in terms of a desired oxygen content of a charge supplied to the intake manifold, the charge comprising fresh air supplied to the intake manifold via the air intake manifold and recirculated exhaust gas supplied to the intake manifold by the EGR conduit.

18. The system of claim 17 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit,
wherein the control circuit is further configured to determine an adjusted mass air flow value as a function of a desired mass air flow value and the first error value, and to produce the throttle control signal as a function of the adjusted mass air flow value and the valve control signal.

19. The system of claim 17 wherein the lambda sensor comprises an oxygen sensor producing an oxygen signal corresponding to an oxygen content of the exhaust gas.

20. The system of claim 17 further including an engine speed sensor producing an engine speed signal indicative of rotational speed of the engine.

21. The system of claim 20 wherein the control circuit is further configured to determine the desired air-to-fuel ratio value as a function of the engine speed signal and the requested torque value.

22. The system of claim 17 wherein the control circuit includes:
a first controller producing a mass air flow adjusted actuator command value as a function of the first error value, and
a first limiter producing the valve control signal as a function of the mass air flow adjusted actuator command value, the first limiter limiting the valve control signal to predefined minimum and maximum valve position values.

23. The system of claim 22 wherein the first controller is a proportional-integral-derivative controller.

24. The system of claim 22 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit,
wherein the control circuit is further configured to produce the throttle control signal as a function of the mass air flow adjusted actuator command value and the valve control signal.

25. The system of claim 24 herein the control circuit further includes a second controller producing an EGR valve command adjusted actuator command value as a function of a third error value, the third error value being calculated as a difference between the mass air flow adjusted actuator command value and the valve control signal, and
a second limiter producing the throttle control signal as a function of the EGR valve command adjusted actuator command value, the second limiter limiting the throttle control signal to predefined minimum and maximum throttle position values.

26. The system of claim 25 wherein the second controller is a proportional controller.

27. A system for controlling a ratio of air and fuel supplied to an internal combustion engine, the system comprising:
an air intake conduit fluidly coupled to an intake manifold of the engine,
an exhaust gas recirculation (EGR) conduit fluidly coupled between an exhaust manifold of the engine and one of the air intake conduit and the intake manifold,
an EGR valve disposed in-line with the EGR conduit, the EGR valve responsive to a first control signal to control exhaust gas flow through the EGR conduit,
a fueling system responsive to a second control signal to supply fuel to the engine,
a lambda sensor producing a lambda signal indicative of air-to-fuel ratio of exhaust gas produced by the engine, and
a control circuit producing a desired air-to-fuel ratio value, the control circuit determining a first error value as a difference between the desired air-to-fuel ratio value and the lambda signal and producing one of the first and second control signals as a function of the first error value,
wherein the desired air-to-fuel ratio value is expressed in terms of a desired oxygen content of a charge supplied to the intake manifold, the charge comprising fresh air supplied to the intake manifold via the air intake manifold and recirculated exhaust gas supplied to the intake manifold by the EGR conduit.

28. The system of claim 27 wherein the lambda sensor comprises an oxygen sensor producing an oxygen signal corresponding to an oxygen content of the exhaust gas.

29. The system of claim 27 wherein the control circuit produces the first control signal as a function of the first error value.

30. The system of claim 29 wherein the first control signal controls the EGR valve.

31. The system of claim 29 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit, wherein the control circuit is further configured to produce the throttle control signal as a function of the first error value and the first control signal.

32. The system of claim 27 wherein the control circuit further produces a desired mass air flow value, and wherein the control circuit further determines an adjusted mass air flow value as a function of the desired mass air flow value and the first error value, the control circuit producing the first control signal as a function of the adjusted air flow value.

33. The system of claim 32 further including a mass air flow sensor in fluid communication with the air intake conduit upstream of the junction of the EGR conduit and the one of the air intake conduit and the intake manifold, the mass air flow sensor producing a mass air flow signal indicative of a mass flow of air through the air intake conduit, wherein the control circuit is configured to determine a second error value as a difference between the adjusted mass air flow value and the mass air flow signal.

34. The system of claim 33 wherein the control circuit produces the first control signal as a function of the second error value to control the EGR valve.

35. The system of claim 33 further including an air intake throttle disposed in-line with the air intake conduit upstream of the junction of the EGR conduit and the one of the air intake conduit and the intake manifold, the air intake throttle responsive to a throttle control signal to control fresh air flow through the air intake conduit, wherein the control circuit is further configured to produce the throttle control signal as a function of the second error value and the first control signal.

* * * * *